United States Patent
Symborski et al.

(10) Patent No.: US 12,481,627 B1
(45) Date of Patent: Nov. 25, 2025

(54) SCHEMA GENERATION WITH COLLISION DETECTION AND CORRECTION

(71) Applicant: Intuit Inc., Mountain View, CA (US)

(72) Inventors: John Patrick Symborski, Edmonton (CA); Sivashanker Thiruchittampalam, Toronto (CA)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/285,513

(22) Filed: Jul. 30, 2025

(51) Int. Cl.
*G06F 16/21* (2019.01)

(52) U.S. Cl.
CPC ................... *G06F 16/211* (2019.01)

(58) Field of Classification Search
CPC .................................................. G06F 16/211
USPC ........................................................ 707/803
See application file for complete search history.

(56) References Cited

U.S. PATENT DOCUMENTS

| | | | | |
|---|---|---|---|---|
| 6,061,515 A * | 5/2000 | Chang | ................... | G06F 16/289 707/999.1 |
| 7,778,816 B2 * | 8/2010 | Reynar | ................. | G06F 40/174 715/224 |
| 2005/0256850 A1 * | 11/2005 | Ma | ........................ | G06F 16/36 |
| 2010/0169758 A1 * | 7/2010 | Thomsen | ................ | G06F 40/18 715/212 |
| 2015/0169774 A1 * | 6/2015 | Budzienski | ............ | G06Q 50/01 707/734 |
| 2019/0188288 A1 * | 6/2019 | Holm | .................... | G06F 16/289 |
| 2025/0156384 A1 * | 5/2025 | Rajagopalan | ........... | H04L 51/02 |
| 2025/0225108 A1 * | 7/2025 | Sharma | ................. | G06F 16/211 |

OTHER PUBLICATIONS

Kim, J. et al., "A Semantic Similarity Analysis for Data Mappings between Heterogeneous XML Schemas", Jan. 1, 2011, 15 pages.

* cited by examiner

*Primary Examiner* — Cam Linh T Nguyen
(74) *Attorney, Agent, or Firm* — Lathrop GPM LLP

(57) ABSTRACT

A method includes constructing a schema segment from a schema segment definition. The schema segment includes a multitude of schema elements. A multitude of embeddings corresponding to the multitude of schema elements is generated by an embedding model. The multitude of schema elements and the multitude of embeddings is grouped into a multitude of categories. A semantic collision between a first embedding of a first schema element and a second embedding of a second schema element of a category of the multitude of categories may be detected. A set of semantic collisions may be obtained. A large language model (LLM) may resolve the set of semantic collisions to obtain a corresponding multitude of updated schema elements. The schema segment is updated with the corresponding multitude of updated schema elements.

20 Claims, 5 Drawing Sheets

Examples of GraphQL schema definition segment
```
# Defines the basic blueprint for any item in our kitchen.
# Any type that implements KitchenItem MUST have these fields.
interface KitchenItem {
  id: ID!
  name: String!
  description: String
}
# An enum to represent the power source for an appliance.
enum PowerSource {
  ELECTRIC
  GAS
  MANUAL
  BATTERY
}
# Represents a kitchen appliance, like a blender or a microwave.
# It implements the KitchenItem interface.
type Appliance implements KitchenItem {
  id: ID!
  name: String!
  description: String
  powerSource: PowerSource!
  wattage: Int
}
# Represents a kitchen utensil, like a spatula or a whisk.
# It also implements the KitchenItem interface.
type Utensil implements KitchenItem {
  id: ID!
  name: String!
  description: String
  material: String
}
```
— 402

```
# The root query for our schema.
# This is where all top-level read operations start.
type Query {
  """
  Fetches a list of all kitchen items, which can be a mix
  of Appliances and Utensils.
  """
  getAllKitchenItems: [KitchenItem!]

"""
  Fetches a single kitchen item by its unique ID.
  The result can be either an Appliance or a Utensil.
  """
  getKitchenItemById(id: ID!): KitchenItem """
  Fetches all appliances.
  """
  getAppliances: [Appliance!]

"""
  Fetches all utensils.
  """
  getUtensils: [Utensil!]
}
```
— 404

*FIG. 4*

SCHEMA GENERATION WITH COLLISION DETECTION AND CORRECTION

BACKGROUND

Formalized data representation languages are frequently used in software application ecosystems, spanning software product offerings, and software services, due to their ability to define structured, interconnected schemas. The schemas facilitate precise data access and manipulation across distributed systems. When used within the structured data representation language framework, these schemas are machine-understandable and interpretable.

Large language models (LLMs) and other generative artificial intelligence (AI) systems are being integrated into software application ecosystems with rapidly rising adoption rates. However, LLMs, whether stand-alone or using retrieval-augmented generation (RAG) techniques, understand and interpret natural language. Thus, an emerging challenge is rendering formalized schemas to be semantically interpretable and usable by AI systems. Specifically, schema documentation in formalized data representation languages may include semantic collisions. Semantic collisions are instances where similar or identical schema elements may be used/defined in conflicting or ambiguous ways. As a result, dense retrieval tasks, such as retrieving data by LLMs, may suffer degraded performance. Moreover, LLMs may generate poorly grounded responses. Further, query result retrieval may suffer reduced precision, and consequently, lower quality outputs may be generated by LLMs and other generative AI systems. Furthermore, semantic duplication and inconsistent naming conventions may hinder the ability of LLMs to accurately contextualize and reason over schema elements, especially in complex or large-scale environments.

SUMMARY

In general, in one aspect, one or more embodiments relate to a method. The method includes constructing a schema segment from a schema segment definition. The schema segment includes a multitude of schema elements. The method further includes generating, by an embedding model, a multitude of embeddings corresponding to the multitude of schema elements. The method further includes grouping the multitude of schema elements and the multitude of embeddings into a multitude of categories. The method further includes detecting a semantic collision between a first embedding of a first schema element and a second embedding of a second schema element of a category of the multitude of categories, to obtain a set of semantic collisions. The method further includes resolving, by a large language model (LLM), the set of semantic collisions to obtain a corresponding multitude of updated schema elements. The method further includes updating the schema segment with the corresponding multitude of updated schema elements.

In general, in one aspect, one or more embodiments relate to a system. The system includes a computer processor, and an embedding model executing on the computer processor. The system further includes a large language model (LLM), executing on the computer processor. The system further includes a developer application, executing on the computer processor. The system further includes a schema improvement engine, executing on the computer processor. The schema improvement engine is configured for constructing a schema segment from a schema segment definition. The schema improvement engine is further configured for causing the embedding model to generate a multitude of embeddings corresponding to the multitude of schema elements. The schema improvement engine is further configured for grouping the multitude of schema elements and the multitude of embeddings into a multitude of categories. The schema improvement engine is further configured for detecting a semantic collision between a first embedding of a first schema element and a second embedding of a second schema element of a category of the multitude of categories, to obtain a set of semantic collisions. The schema improvement engine is further configured for causing the LLM to resolve the set of semantic collisions to obtain a corresponding multitude of updated schema elements. The schema improvement engine is further configured for updating the schema segment with the corresponding multitude of updated schema elements.

In general, in one aspect, one or more embodiments relate to a method. The method includes obtaining a multitude of semantic collisions corresponding to a multitude of schema element pairs of a category. The category comprises a multitude of schema elements of a schema segment. The method further includes performing, by an LLM, operations including obtaining a schema element pair corresponding to a semantic collision. The operations further include generating a description of the at least one schema element, and updating the at least one schema element, responsive to at least one schema element of the schema element pair having a missing description. The operations further include generating a first description for the first schema element and a second description for the second schema element, wherein the first description is dissimilar to the second description, responsive to a first schema element and a second schema element of the schema element pair having near-duplicate descriptions. The operations further include updating the first schema element and the second schema element respectively with the first description and the second description. The operations further include defining a canonical schema element, including common data types and descriptions of the first schema element and the second schema element, responsive to the first schema element and the second schema element of the schema element pair being near-duplicates. The operations further include replacing the first schema element and the second schema element with the canonical schema element in the schema segment. The operations further include updating references to the first schema element and the second schema element in the schema segment with a reference to the canonical schema element.

Other aspects of one or more embodiments will be apparent from the following description and the appended claims.

BRIEF DESCRIPTION OF DRAWINGS

FIG. 4 shows an example, in accordance with one or more embodiments.

Like elements in the various figures are denoted by like reference numerals for consistency.

DETAILED DESCRIPTION

One or more embodiments are directed to schema generation with collision detection and correction. Specifically, embodiments improve the semantic clarity and retrieval accuracy of schema segments of the schema, particularly in environments leveraging LLMs and RAG-based systems. The collision detection and correction may include multiple stages.

A first stage is segmentation. In the segmentation stage, the schema is first partitioned into logical schema segments, such as subgraphs or namespaces. Each schema segment is processed by an embedding model to generate vector representations (i.e., embeddings) for individual schema elements.

In a second stage, categorization is performed. During categorization, the embeddings of schema elements of the schema segment are grouped into categories (e.g., by field, type, or subgraph) to facilitate structured comparison and analysis.

A third stage is an identification stage. In the identification stage, semantic collisions between schema elements of a particular schema element kind (i.e., type, field, or subgraph) are detected by analyzing the proximity of embeddings in the vector space. Collisions are identified when embeddings of distinct schema elements are not dissimilar enough for a difference to be discerned. The lack of a discernible difference, either by a human or a machine, may indicate a potential ambiguity or duplication of the schema elements being compared.

A fourth stage is an improvement stage. In the improvement stage, an LLM is invoked to resolve the identified semantic collisions. The LLM may perform multiple operations, including description enhancement, semantic deduplication, field consolidation, type normalization, and naming optimization. The updated schema elements are then reintegrated into the schema segment.

The various stages may be executed in an iterative auto-improvement loop. The iterative auto-improvement loop may be executed repeatedly to continuously refine the schema, ensuring that the revised schema remains semantically distinct, contextually rich, and optimized for AI-driven retrieval and generation tasks.

Figure 1:
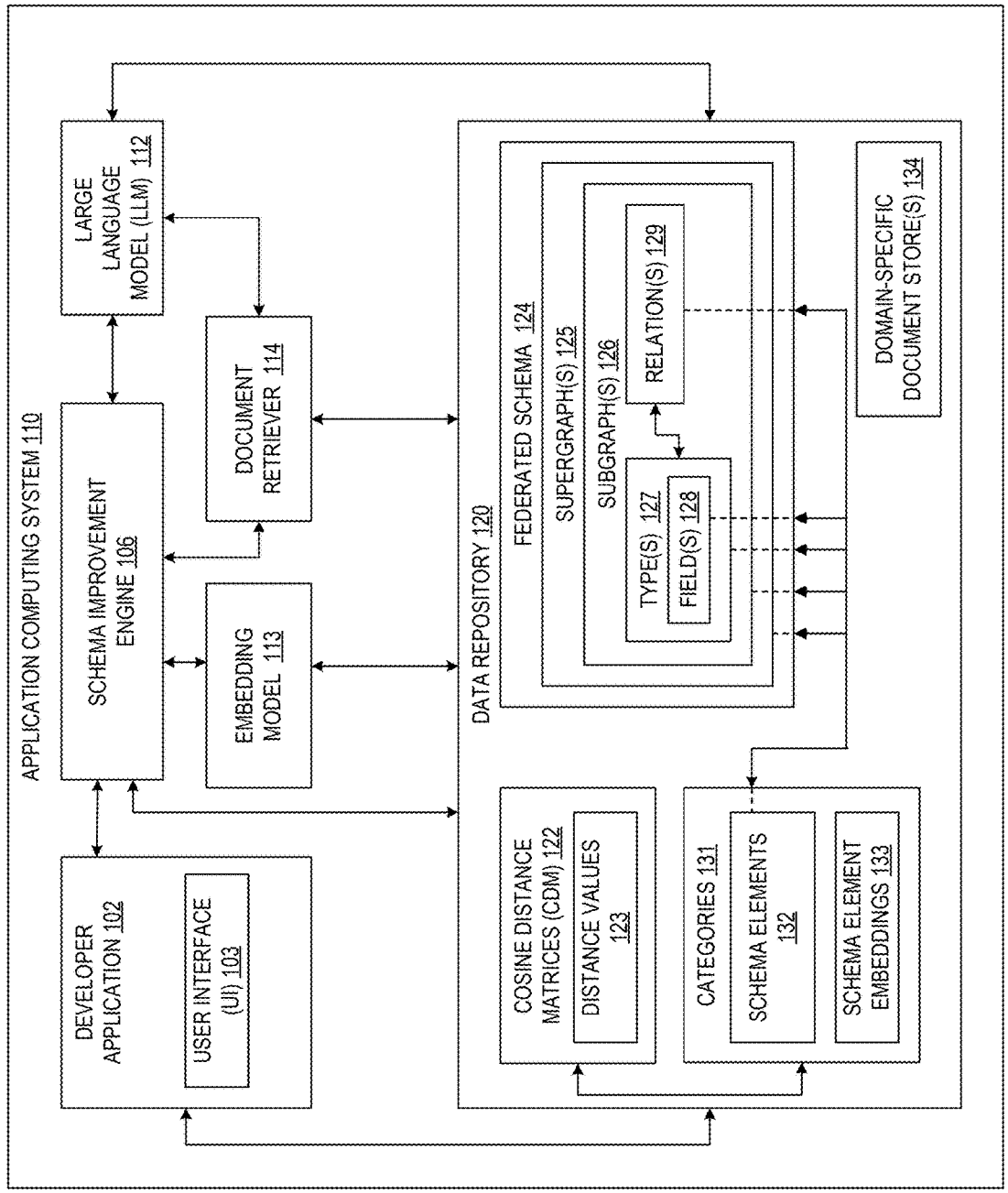
FIG. 1 shows a computing system in accordance with one or more embodiments.

Attention is now turned to the figures. FIG. 1 shows a computing system, in accordance with one or more embodiments. The system shown in FIG. 1 may include an application computing system (110). The application computing system (110) is one or more computer processors, data repositories, communication devices, and supporting hardware and software. The application computing system (110) may be in a distributed computing environment. The application computing system (110) includes a computer processor. The computer processor is one or more hardware or virtual processors which may execute computer readable program code that defines one or more applications, such as the developer application (102), the schema improvement engine (106), the embedding model (113), the document retriever (114), or the large language model (LLM) (112). An example of the computer processor is described with respect to the computer processor(s) (502) of FIG. 5A. Thus, the application computing system (110) is configured to execute one or more applications, such as the developer application (102), the schema improvement engine (106), the embedding model (113), the document retriever (114), or the LLM (112). An example of a computer system and network that may form the application computing system (110) is described with respect to FIG. 5A and FIG. 5B.

The system shown in FIG. 1 includes a data repository (120). The data repository (120) is a type of storage unit or device (e.g., a file system, database, data structure, or any other storage mechanism) for storing data. The data repository (120) may include multiple different, potentially heterogeneous, storage units and/or physical storage devices.

The data repository (120) includes a federated schema (124). The federated schema (124) further includes one or more supergraph(s) (125). A supergraph (125) is composed of one or more subgraph(s) (126). A subgraph (126) is composed of one or more types (127), having one or more fields (128). The types (127) and fields (128) of a subgraph may be interconnected by one or more relation(s) (129).

As a general overview, a schema is a structured representation of data pertaining to physical or virtual entities of a given domain. An entity is a distinct, identifiable unit of meaning in the domain being modeled, for example, a physical object (car), a conceptual object (a contract of sale), or a digital construct (a user of a software application). Entities are the building blocks of a schema. Entities may have one or more attributes. An attribute is a property or characteristic of an entity. It describes a particular aspect of the entity's identity, state, or behavior. Thus, a schema is a structured representation of domain-specific data, defining the types of entities and attributes involved, and the relationships between entities. A schema serves as a blueprint for how data is organized, validated, and queried.

In one or more embodiments, the schema is a federated schema. A federated schema integrates multiple schemas, potentially from different data sources or technologies, and domains, into a unified model. Examples of diverse data sources include GraphQL schemas, OpenAPI, Protobuf, AsyncAPI, etc. Further examples may include RDBMS, NoSQL schemas modeled as graph schemas. Thus, a federated schema may provide a uniform, query-able interface across heterogeneous data sources while preserving the autonomy and structure of each underlying system.

Accordingly, the federated schema (124) may be constituted of a multitude of schema elements. The schema elements may include the supergraphs (125), subgraphs (126), types (127), and fields (128). A type (127) defines a structured entity, such as a user or product, and includes one or more fields (128), which represent the attributes or properties of the particular type (e.g., name, price, email). Types (127) and fields (128) may be interconnected through relations (129), forming a query-able graph-like structure. Examples of relations (129) include reference fields in GraphQL, or foreign keys in RDBMS. Notably, the fields (128) may be considered to be atomic (schema) elements. An atomic schema element is a fundamental, indivisible unit of meaning within a schema. The types (127) may be considered to be composite schema elements. Composite schema elements are structured groupings of other atomic or composite schema elements, that organize their constituent schema elements into coherent models.

The subgraph(s) (126) represent a modular portion of the schema, typically owned by a specific service or domain, and includes a collection of types (127), fields (128) and relations (129) relevant to that domain. The supergraph(s) (125) may aggregate multiple subgraphs (126) into a single, query-able model, providing abstraction layers between subgraphs, and to the "outside world." In one or more embodiments, the supergraph (125) may be query-able via a single Application Programming Interface (API) surface.

Examples of frameworks, or architectures for federating schemas such as RDBMS, NoSQL, or GraphQL, include Apollo Federation. In one or more embodiments, the federated schema (124) may be a federation of one or more GraphQL schemas. In GraphQL schemas, types (entities), attributes (fields), and relations may form a logical graph that serves as a semantic map of a domain. Thus, a supergraph (125) may constitute a GraphQL schema.

In one or more embodiments, the federated schema (124) may be queried using GraphQL queries. GraphQL includes a query language and a schema definition language (SDL). Schema definition languages are formal human and machine-readable languages that describe the types, fields, and relationships of a schema. Another example of a schema definition language is the data definition language (DDL) of sequential query language (SQL). As a schema definition language, GraphQL SDL provides a structured, human and machine-readable readable syntax for defining types, fields, and relations.

Notably, the federated schema (124) may be queried in GraphQL for a schema segment. A schema segment is a portion of the federated schema (124), defined at the level of a subgraph, supergraph, or namespace. The schema segment may be obtained from the federated schema (124) for analysis and optimization. The result of the query may be a schema segment definition. The schema segment definition may be returned as a GraphQL SDL (Schema Definition Language) string. The GraphQL SDL string represents the structure of the requested segment, including its types, fields, and relations using a formal parsable syntax. The schema segment may include one or more schema elements (132).

The data repository (120) further includes one or more categories (131). The categories are logical groups of schema elements (132). In one or more embodiments, a developer using the developer application (102) may request the schema segment, for analysis and optimization. Obtaining the schema segment is described in detail in reference to the method of FIG. 2.

The schema elements (132) correspond to the diverse schema elements found in the federated schema (124). For example, the schema elements may be super graphs (125), subgraphs (126), types (127), fields (128), and relations (129). The categories (131) may be based on one or more "kinds" of schema elements (132). The "kind" of a schema element is the logical category of the particular schema element within the schema. A schema element that is a field, may have a kind that is "field." A schema element that is a subgraph may have a kind that is "subgraph." A schema element that is a type, may have a kind that is "type." Accordingly, the categories (131) may include "field," "type," "subgraph," etc. categories.

The categories (131) include schema element embeddings (132) corresponding to the schema elements (132). In one or more embodiments, a one-to-one mapping may exist between a schema element (132) and a corresponding schema element embedding (133). A schema element embedding (133) is a vector representation of a corresponding schema element (132). In one or more embodiments, schema element embeddings (133) may be obtained from the embedding model (111).

As a general overview, an embedding is a mathematical representation of an object (e.g., a word, image, or schema element) as a vector in a high-dimensional space. An embedding captures the semantic meaning or structural properties of the represented object for comparison, clustering, or reasoning, using numerical methods. In the case of schema elements, an embedding is a vector generated from a schema element, such as a field, type, or subgraph, that encodes the semantic and structural characteristics of the particular schema element. Thus, schema element embeddings (133) may be analyzed, compared, or searched using machine learning techniques. By way of example, a field such as "email: String" might be embedded as a vector that reflects its name, data type, usage context, and relationships. Additionally, the metadata of the schema element, such as its description, kind, and location in the schema hierarchy may be converted to vector embeddings. The generated embeddings may collectively constitute the schema element embedding (133). As another example, a type "User," containing fields like "id," "name," and "email" may have its own embedding that reflects the aggregate meaning of its fields and its role in the schema. Similarly, a subgraph or namespace might have an embedding that captures the domain semantics of all the types and fields it contains. In one or more embodiments, the schema element embeddings (133) may be generated by the embedding model (113).

In one or more embodiments, the categories (131) may be obtained during a categorization step in the auto-improvement loop of the optimization of the federated schema (124). Obtaining the categories (131) is described in further detail in reference to the method of FIG. 2.

The data repository (120) further includes one or more cosine distance matrices (CDM) (122). The CDMs (122) correspond to the categories (131). That is, there may be a one-to-one mapping between the cosine distance matrices (122) and the categories (131). The cosine distance matrices (122) include distance values (123) of pairwise embeddings corresponding to diverse pairs of the schema elements (132) of the corresponding categories (131). The CDMs (122) may be used to determine a dynamic collision threshold for a particular category, to detect semantic collisions between schema elements of a particular category. Determining the dynamic collision threshold is described in further detail in reference to the method of FIG. 2. Notably, the collision threshold may be considered as dynamic, due to the collision threshold being determined in accordance with statistical properties of the CDMS (122). Further, distance values (123) of the CDMs (122) may be determined for the categories (131) for a given iteration of the auto-improvement loop.

As a general overview, cosine distance matrices are a structured representation of the semantic dissimilarity between pairs of embeddings. Each element in a cosine distance matrix quantifies the differences between two objects, based on the cosine of the angle between the corresponding embedding vectors in high-dimensional space. Specifically, cosine similarity measures how two aligned vectors are (1=identical direction, 0=orthogonal, −1=opposite). Cosine distance is typically defined as 1−cosine similarity. Thus, smaller values may indicate higher similarity. Thus, the cosine distance matrix may act as a "semantic heatmap," in which each cell indicates how far apart two schema elements are, meaning, based on their respective embeddings. In the context of schema analysis, the schema element embeddings (133) of a category (131) may be paired and compared using cosine distance. The resulting corresponding CDM (122) may capture the semantic landscape of the particular category, showing which schema elements are semantically similar (close) or dissimilar (far apart).

The data repository (120) further includes one or more domain-specific document store(s) (134). The domain-specific document store(s) (134) are document corpora pertaining to the diverse business and technology domains of the enterprise deploying the application computing system (110). In one or more embodiments, the domain-specific document stores (134) may be accessed by the document retriever (114). The document retriever (114) may retrieve business and domain-logic specific information that the LLM (112) may request, in order to resolve semantic collisions and other optimizations to be performed on the schema segment being analyzed and optimized.

The application computing system (110) further includes a schema improvement engine (106). The schema improvement engine (106) is software or application specific hardware which, when executed by the computer processor, controls and coordinates operation of the software or application specific hardware described herein. Thus, the schema improvement engine (106) may control and coordinate execution of the LLM (112), the embedding model (113), the document retriever (114), and the developer application (102). Further, the schema improvement engine (106) may essentially perform the method of FIG. 2.

The application computing system (110) further includes an embedding model (113). The embedding model (113) is a machine learning model that generates semantic embeddings of schema elements. In one or more embodiments, the embedding model (113) may have a transformer architecture. Further, the embedding model (113) may be fine-tuned on proprietary, domain-specific corpora pertaining to the federated schema and related business and technology topics. The embedding model (113) may be configured to receive structured schema element inputs and generate high-dimensional vector representations, i.e., embeddings. The embeddings capture the semantic and structural characteristics of individual schema elements. The schema elements may include a kind identifier (e.g., field, type, subgraph) and associated description metadata (e.g., name, data type, documentation, usage context). Thus, in generating the corresponding schema element embeddings, the embedding model (113) may encode the local semantics (e.g., field-level meaning) and contextual semantics (e.g., type-level or domain-level relationships) of the schema elements. Notably, the embedding model (113) may generate embeddings at multiple levels of abstraction—e.g., individual fields, container composite types, or entire schema segments including one or more subgraphs. Examples of embedding models (113) include Bidirectional Encoder Representations from Transformers (BERT), Sentence-BERT, etc.

The application computing system (110) further includes a LLM (112). LLMs are artificial intelligence (AI) systems that are designed to understand and generate natural language at scale. LLMs are trained on vast corpora of data and have deep neural network architectures, specifically, transformer architectures. The LLM (112) may be fine-tuned or prompted to specialize in domain-specific knowledge. As shown in FIG. 1, the LLM (112) is a retrieval-augmented generation (RAG) LLM. RAG-LLMs dynamically retrieve relevant documents from external corpora (external to the LLMs internal training data) at inference time. The retrieved information is incorporated into the context window of the LLM. Accordingly, the LLM generates responses that are up-to-date and domain-specific. The LLM (112) functions as a hybrid semantic engine, where a retriever module, namely, the document retriever (114), selects relevant content based on a user query or schema element. The generative component of the LLM (112) synthesizes a coherent, informed response using both the query and the retrieved relevant content.

The application computing system (110) further includes a document retriever (114). The document retriever (114) may operate in conjunction with the LLM (112) in a RAG framework. The document retriever (114) may be configured to retrieve a focused set of documents in response to the LLM (112) request for further information, specifically, regarding one or more schema elements. Notably, the document retriever (114) may not generate language or interpret meaning. Instead, the document retriever (114) may select information that will be passed to the LLM for interpretation and response generation. The document retriever (114) may retrieve data from enterprise knowledge bases, the domain-specific document stores (134), or vectorized schema catalogs. Examples of document retrievers integrated into RAG systems with LLMs include Okapi BM25, Contriever from Meta AI, Contextualized Late Interaction BERT (ColBERT), Facebook AI Similarity Search (FAISS), ElasticSearch, specialized vector databases such as Weaviate, Pinecone, Milvus, Qdrant, etc.

The application computing system (110) further includes a developer application (102). The developer application (102) is software or application specific hardware, which, when executed on the computer processor, is configured to assist software developers and data architects to define, query, and modify the federated schema (124). A request for a schema change of a portion (schema segment) of the federated schema (124) may be received by the schema improvement engine (106) from the developer application (102). The request may trigger the schema analysis and optimization iterative process, described in the method of FIG. 2. The developer application (102) further includes a user interface (UI) (103). The UI (103) may be configured to present one or more schema visualizations as a result of requesting a schema change. Further, the UI (103) may be configured to present schema elements having semantic collisions, missing descriptions, or other metadata, etc., of the schema segment requested.

While FIG. 1 shows a configuration of components, other configurations may be used without departing from the scope of one or more embodiments. For example, various components may be combined to create a single component. As another example, the functionality performed by a single component may be performed by two or more components.

Figure 2:
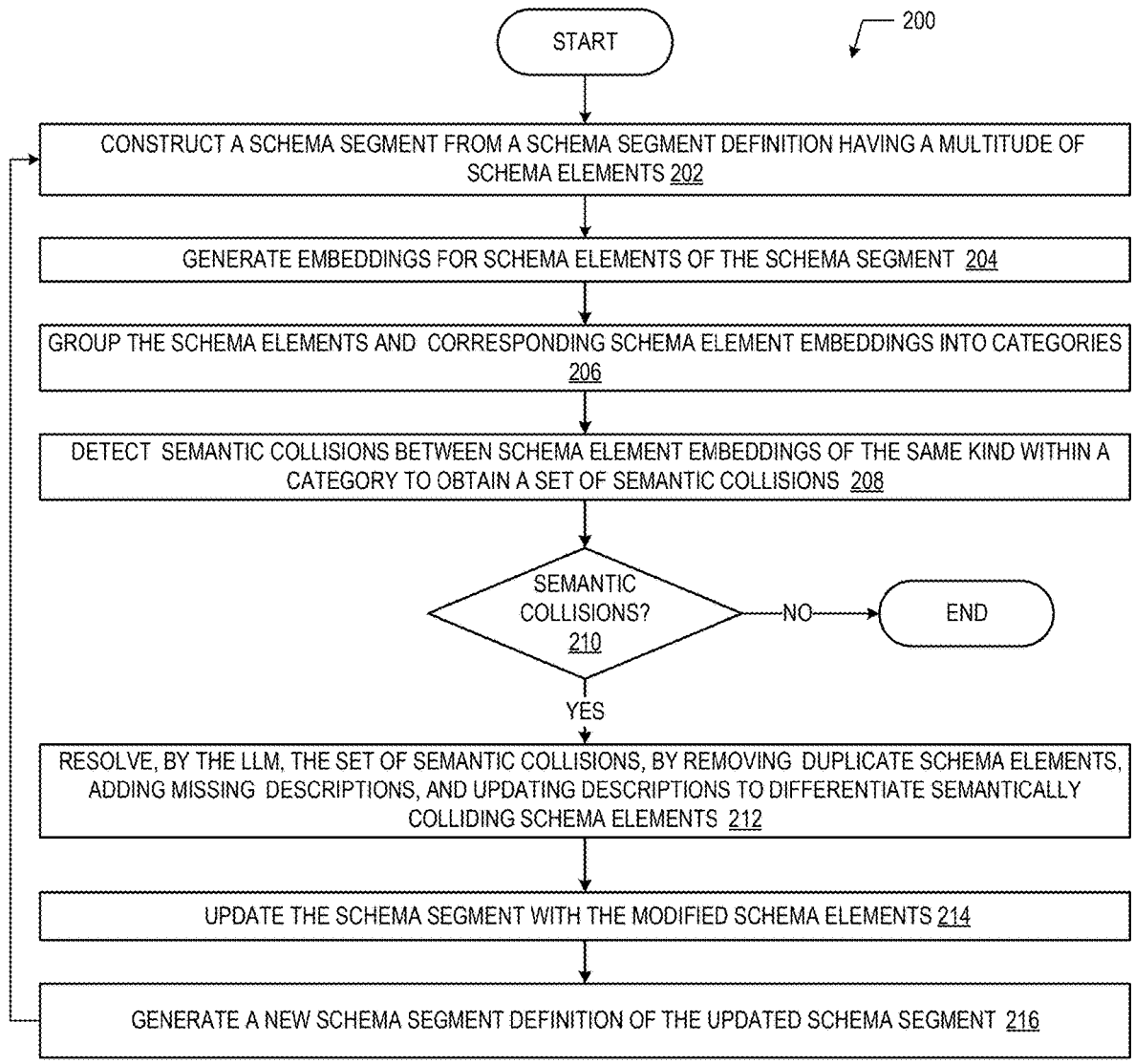
FIG. 2 shows a flowchart of a method in accordance with one or more embodiments.

FIG. 2 shows a flowchart (200) of a method for analysis and optimization of a schema, in an auto-improvement loop, in accordance with one or more embodiments. The method of FIG. 2 may be implemented using the system of FIG. 1 and one or more of the steps may be performed on or received at one or more computer processors. While the various steps in the flowchart (200) are presented and described sequentially, at least some of the steps may be executed in different orders, may be combined or omitted, and at least some of the steps may be executed in parallel. Furthermore, the steps may be performed actively or passively.

As described herein, the terms "schema element embedding(s)," and "embedding(s)" are used interchangeably, and refer to the embeddings generated by the embedding model of the schema elements of the schema segment.

In Block 202, a schema segment is constructed from a schema segment definition having a multitude of schema elements. In one or more embodiments, the schema segment definition may include a multitude of string representations. An example of a schema segment definition, in GraphQL SDL is shown in FIG. 4. Because GraphQL SDL defines schemas using a formal, parsable syntax, the schema segment definition may be programmatically interpreted or parsed to reconstruct the schema segment. In one or more embodiments, the schema segment definition may be received by the schema improvement engine. Further, the schema segment definition may be parsed to obtain the schema segment. The schema segment is a structured, in-memory representation of the schema segment definition. The schema segment may include the multitude of schema elements. The multitude of schema elements may include types, fields, relationships, subgraphs, etc. A schema element may include a name of the schema element, a data type of the schema element, a description of the schema element, and a schema element kind. Further, other properties of the schema element may include relations with other schema elements. An example of a schema element is shown in FIG. 4.

In Block 204, embeddings are generated for schema elements of the schema segment. In one or more embodiments, the embedding model may be invoked by the schema improvement engine to generate embeddings for the schema elements. In one or more embodiments, if a schema element of the multitude of schema elements is an atomic element, then the embedding for the particular schema element may be generated by the embedding model. The embedding may encode a name of the schema element, a description of the schema element, and a schema element kind of the schema element. By way of example, a field schema element such as "email: String" may be encoded as a vector that reflects the name (i.e., "email"), data type (i.e., "String"), usage context and relationships (i.e., from the description, or metadata of the schema element) and the kind of schema element (i.e., "field"). Further, the vector may encode the relation of this field schema element to a type (e.g., user, vendor, etc.).

In one or more embodiments, a schema element may be a composite element. A composite element is a schema element that includes multiple schema elements. For example, the composite element may be type, subgraph, or supergraph. If the schema element is a composite element, then the embedding model may encode the diverse levels of detail and abstraction of the composite schema element to generate multiple embeddings. More particularly, the embedding of the composite element may encode at least a name of the schema element, a description of the schema element, a schema element kind of the schema element, and respective embeddings of the set of schema elements within the composite schema element.

By way of example, if the schema element is a schema element of type "User," having fields {id: ID!; name: String; email: String;}, then one embedding may be generated for the entire type. That is, a single vector may be generated that represents the "User" type as a whole. The embedding may aggregate the semantics of all the constituent fields of type "User," metadata and relations of User. Further, embeddings may be generated for each field of the User type. That is, the fields User.id, User.name, and User.email may each be encoded in corresponding field embeddings. The field embeddings may be available individually. Additionally, or alternatively, the field embeddings for the fields id, name, and email, may be aggregated to form the embedding for the type "User." In a similar manner, an embedding for a subgraph may encode the subgraph as a whole. Additionally, or alternatively, the embedding for the subgraph may be obtained by aggregating the embeddings of the constituent types and field of the subgraph.

In the context of schema embeddings, aggregation refers to the process of combining multiple embeddings into a single, higher-level embedding, such as for a type or subgraph. Some methods for aggregating embeddings may include mean pooling, weighted averaging, concatenation, transformer-based aggregation, etc. Notably, an embedding of a composite schema element, aggregated from constituent schema elements of the particular schema element may be different from an embedding of the schema element when generated directly, or as a whole.

In Block 206, the schema elements and corresponding schema element embeddings are grouped into categories. In one or more elements, a sub-group of schema elements may be selected from the multitude of schema elements, based on schema element kinds of the sub-group of schema elements. That is, the selected sub-group of schema elements may all be of the same schema element kind. For example, one sub-group of schema elements may be of the schema element kind "field." Another sub-group of schema elements may be of the schema element kind "type." The sub-group of schema elements and corresponding schema element embeddings may be added to a category. A multitude of categories may be obtained in this manner.

In one or more embodiments, when the schema element is of a subgraph or supergraph kind, a domain-specific categorization strategy may be applied for generating categories. A goal of applying domain-specific categorization strategies may be to improve the value of comparison operations. In domain-specific categorization strategies or schemes, categories may be generated such that schema elements of the same schema element kind, and part of the same subgraph may be compared. Additionally, or alternatively, categories may be generated such that a subgraph may be compared to other subgraphs of the same parent supergraph. The schema elements of subgraph and supergraph kinds may be organized in this manner into logical, domain-specific categories to maximize the utility of in-category comparisons. These groups may be smaller in size (i.e., include fewer schema elements) and more semantically coherent, optimizing the comparison process. For example, smaller (in size), and focused categories may yield higher-value comparisons by reducing irrelevant matches and emphasizing meaningful semantic relationships. Thus, the categorization scheme for schema elements that are subgraphs and supergraphs may be both schema-specific and domain-specific. As a result, the comparison strategy within a category may align with the structure and semantics of the enterprise's data model. Further, the categorization scheme may facilitate the generation of contextually relevant and actionable insights when producing reports or recommendations.

In Block 208, semantic collisions are detected between schema element embeddings of the same kind within a category. In one or more embodiments, a semantic collision may be detected between a first embedding of a first schema element and a second embedding of a second schema element. The first and second schema elements may be included in a category of the multitude of categories. A set of semantic collisions within the category may be obtained in this manner. The set of semantic collisions may include semantic collisions occurring in diverse categories of the multitude of categories.

In one or more embodiments, a cosine distance matrix may be constructed for a particular category. The cosine distance matrix may include one or more distance values. The distance values may be cosine distance values of a cosine distance function applied to diverse pairs of schema elements of the particular category. Notably, the schema elements may be of the same schema element kind. The distance values may be compared to a collision threshold. In one or more embodiments, the collision threshold may be defined as a predefined minimum semantic distance, measured using a cosine distance function, that exists between two embeddings, for the two embeddings to be considered distinct. If the cosine distance between two embeddings falls below this threshold, the embeddings may be considered too similar. That is, the two embeddings may be semantically indistinguishable to a human or an LLM. The aforementioned condition may be referred to as a semantic collision, where the two schema elements cannot reliably be differentiated.

Further, the collision threshold may be dynamically determined, based on one or more statistical properties of the cosine distance matrix of the particular category. In one or more embodiments, determining the collision threshold may include at least one of applying a percentile-based threshold, using the mean and standard deviation of the cosine distance matrix to define the collision threshold, the elbow method, minimum distance gap, etc.

Accordingly, in one or more embodiments, for a category of the multitude of categories, a cosine distance matrix may be constructed. The cosine distance matrix may include cosine distance values of embeddings of schema element pairs. Further, the schema elements of a schema element pair may have matching schema element kinds. A collision threshold corresponding to the category may be determined, based on a statistical property of the cosine distance matrix. Thus, the semantic collision may be detected between the first embedding of the first schema element and the second embedding of the second schema element (of the schema element pair), if the cosine distance value obtained by applying a cosine distance function to the first and second embedding falls below the collision threshold of the particular category. In one or more embodiments, the multitude of categories may be processed in a similar manner to obtain the set of semantic collisions. In one or more embodiments, the semantic collision may be added to a set of semantic collisions. An element of the set of semantic collisions may include the pair of schema elements, and corresponding schema element embeddings. Thus, the set of semantic collisions may include semantic collisions occurring in diverse categories of the multitude of categories.

In Block 210, a check is carried out to detect whether any semantic collisions between schema element embeddings were detected within the categories. In one or more embodiments, a semantic collision between the first embedding of the first schema element and the second embedding of the second schema element is detected. The semantic collision is detected if a cosine distance value of the first embedding and the second embedding falls below the collision threshold. If a semantic collision is detected, control passes to Block 212, for further resolution of the semantic collision. On the other hand, if no semantic collision is detected, then the auto-improvement loop terminates, and the method ends.

In Block 212, the LLM is invoked to resolve the set of semantic collisions. The LLM may perform operations including removing duplicate schema elements, adding missing descriptions of schema elements, and updating descriptions of schema elements to differentiate semantically colliding schema elements. Resolving the set of semantic collisions may entail updating the schema elements that are semantically colliding. As a result a multitude of updated schema elements may be obtained.

In one or more embodiments, the LLM may perform diverse operations to resolve the set of semantic collisions. One operation that may be performed by the LLM is description enhancement. In the description enhancement operation, the LLM may automatically generate and add meaningful descriptions to fields and types lacking documentation (missing descriptions). For example, in previous sessions, developers adding new types and fields to the federated schema may omit entering a meaningful description, or omit entering any description of the new type/field. Hence, one or more schema elements may have a missing description, and other metadata, which would differentiate the particular schema element from other schema elements. By way of example, a field may be defined as XYZ_SKU. The description of the field may be missing, e.g., the developer defining the field may have omitted or overlooked entering a description for XYZ_SKU. SKUs generally refer to a unique, internal code assigned to products for inventory management. In this case, internal domain-specific and business documents may be searched/retrieved by the document retriever. The domain-specific/business documentation may have additional information related to XYZ_SKU. Based on the retrieved information, the LLM may generate a description of the field XYZ_SKU, which may be added to the description entry of the field XYZ_SKU in the schema segment.

In one or more embodiments, the LLM may perform an operation of semantic deduplication. In the semantic deduplication operation, the LLM may identify and resolve duplicate, or near-duplicate descriptions, i.e., semantically highly similar descriptions, of a schema element pair having a semantic collision. In one or more embodiments, similar to the description enhancement operation, domain-specific and business-specific documents may be searched/retrieved by the document retriever, corresponding to the individual schema elements of the semantically colliding schema element pair. The LLM may then use the retrieved information to generate semantically disambiguated descriptions for each schema element of the semantically colliding schema element pair.

In one or more embodiments, the LLM may perform an operation of field consolidation. In the field consolidation operation, the LLM may consolidate near-identical fields into a single canonical definition. The semantically colliding fields may be identified within a single subgraph, or across multiple subgraphs. When the semantically colliding fields are compared, the field names, data types, and metadata may be compared. If the fields define essentially the same concept (e.g., XYZ_SKU and ABC_SKU), the LLM may suggest a canonical field definition for "SKU." Further, the LLM may suggest a replacement of variations of the "SKU" field with the canonical field and updating the references to the SKU field across the schema segment.

Type normalization may be another operation performed by the LLM, similar to field consolidation. In type normalization, semantically colliding types may be compared by the LLM for name similarity, constituent fields, and embedding-based semantic similarity. When duplicate or near-duplicate types are found (e.g., Customer and User), the LLM may recommend a normalized type definition. The LLM may suggest merging the types, renaming for consistency, or establishing inheritance, or aliasing relationships.

Accordingly, in one or more embodiments, the LLM may generate a first description corresponding to the first schema element and a second description corresponding to the second schema element, wherein the first description is dissimilar to the second description. Further, the LLM may modify the first schema element and the second schema element to include the corresponding first and second descriptions. Further, responsive to the second schema element being a near-duplicate of the first schema element, the LLM may define a canonical schema element. The LLM may further replace the first schema element and the second schema element with the canonical schema element, and update references to the first schema element and the second schema element in the schema segment with the canonical schema element. Thus, in Block 214, the schema segment is updated with the modified schema elements. The definition of the canonical schema element may include common data types and descriptions of the first schema element and the second schema element.

In Block 216, a new schema segment definition is generated of the updated schema segment. Further, the iterative process of the auto-improvement loop continues, with control being passed back to Block 202. In one or more embodiments, in a succeeding iteration of the auto-improvement loop, further semantic collisions may be detected as a result of updates to the schema segment in a previous iteration. Thus, at least one additional semantic collision may be detected, and added to the set of semantic collisions, responsive to updating the schema segment. In this case, the Blocks 202-216 may be iteratively performed until the set of semantic collisions is resolved.

Figure 3:
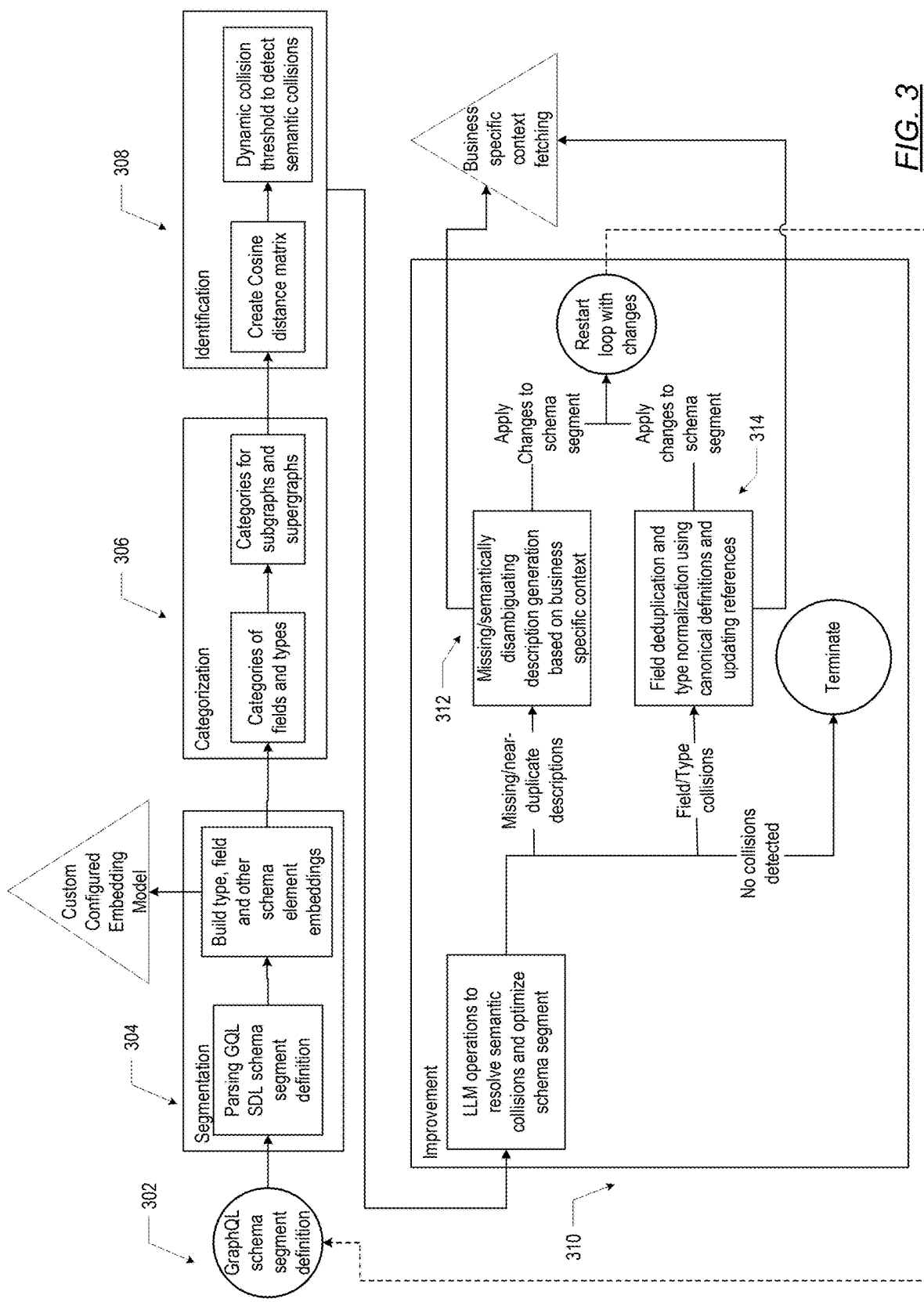
FIG. 3 shows an example, in accordance with one or more embodiments.

FIG. 3 shows an example implementation of the method of FIG. 2, in the form of a process flow diagram, in accordance with one or more embodiments. The process flow diagram shows the method of FIG. 2 implemented as an auto-improvement loop. The following example is for explanatory purposes only and not intended to limit the scope of one or more embodiments.

An endpoint of the example implementation is shown in Block 302 of FIG. 3. The endpoint may be a schema change request by a developer using the developer application of FIG. 1. The requested schema segment may be serialized into a string representation, expressed in the GraphQL SDL. The string representation is the GraphQL schema segment definition.

Block 304 shows the processes implemented in the segmentation phase. In Block 304, the schema segment definition is parsed, and a structured, in-memory schema segment is obtained. The in-memory schema segment may be referred to as the "working schema." Embeddings are then generated by the embedding model for the types, fields, and other schema elements of the working schema. In the example implementation, the embedding model is custom-configured (trained on domain and business-specific document corpora of the enterprise) to generate embeddings that capture the semantic meaning, and interrelationships between the schema elements.

Block 306 shows the processes implemented in the categorization phase. The schema elements are grouped into categories based on schema element kinds. Categories may be generated for schema elements that are fields, and further, for schema elements that are types. In the case of subgraphs and supergraphs, categories may be generated for subgraphs of a particular supergraph. The categories may correspond to a schema element kind. Categories may further be created for subgraphs and supergraphs that are from a particular business or technology domain.

Block 308 shows the processes that are implemented in the identification phase. In Block 308, cosine distance matrices are created for the categories obtained in Block 306. An element of the cosine distance matrix is a cosine distance value. The cosine distance value represents a semantic dissimilarity between two schema elements of the same schema element kind. The cosine distance value may be obtained by applying a cosine distance function to the two schema elements. A dynamic collision threshold is determined, corresponding to a given cosine distance matrix. The collision threshold may be determined based on a statistical property of the given cosine matrix. The collision threshold of a given cosine distance matrix serves as a lower boundary of the dissimilarity between two schema elements. If a cosine distance value of the cosine distance matrix falls below the collision threshold, then the two schema elements corresponding to the cosine distance value are considered to be semantically colliding.

Block 310 shows the processes that are implemented in the improvement phase. The improvement phase entails use of the LLM by the schema improvement engine to obtain missing and/or semantically disambiguating descriptions for schema elements, as shown in Block 312. Further, field deduplication and type normalization may be implemented as shown in Block 314, by the LLM generating canonical field/type definitions for duplicate fields/types and updating references of the duplicate field/types with the canonical field/type. The operations may be performed by the LLM using RAG. Business-specific context documentation may be fetched by the LLM, and used for generating descriptions and canonical field/type definitions.

The schema segment is updated with the changes obtained from the LLM and the auto-improvement loop continues until a stopping condition is met. The stopping condition is that no further semantic collisions are detected.

FIG. 4 shows examples of schema definitions in the GraphQL SDL, and some example prompts for the LLM. The following example is for explanatory purposes only and not intended to limit the scope of one or more embodiments.

Block 402 shows a schema segment definition for a kitchen inventory management system. An interface type, referred to as "KitchenItem," is defined to represent the common structure shared by all kitchen-related items. The KitchenItem interface includes required fields, namely, "id," a unique identifier of type ID!, "name," a non-nullable string representing the name of the item, and "description," a string providing a description of the item. Two concrete object types are defined, implementing the KitchenItem interface. The "Appliance" object represents powered kitchen devices. In addition to the fields inherited from KitchenItem, the Appliance object includes "powerSource," a non-nullable field of type "PowerSource," defined as the ENUM shown in Block 402, and "wattage," representing a power consumption of the Appliance. Another concrete object defined is the "Utensil" object.

Block 404 shows root-level query examples defined to facilitate data retrieval operations. The query fields provided include getAllKitchenItems, returning a list of all kitchen items, which may include both Appliance and Utensil types. The return type is a list of non-nullable KitchenItem interface objects. Another query field is getKitchenItemById(id: ID!), which accepts a unique identifier and returns a single KitchenItem object, which may be either an Appliance or a Utensil. Further query fields include getAppliances, returning a list of all Appliance objects, and getUtensils, returning a list of all Utensil objects.

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

Figure 5A:
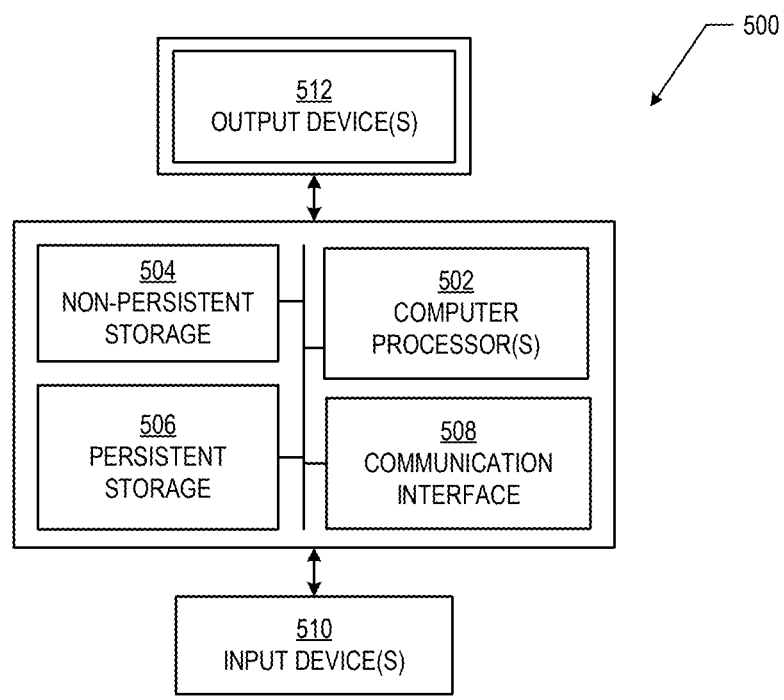
FIGS. 5A and 5B show a computing system in accordance with one or more embodiments.

For example, as shown in FIG. 5A, the computing system (500) may include one or more computer processor(s) (502), non-persistent storage device(s) (504), persistent storage device(s) (506), a communication interface (508) (e.g., Bluetooth interface, infrared interface, network interface, optical interface, etc.), and numerous other elements and functionalities that implement the features and elements of the disclosure. The computer processor(s) (502) may be an integrated circuit for processing instructions. The computer processor(s) (502) may be one or more cores, or micro-cores, of a processor. The computer processor(s) (502) includes one or more processors. The computer processor(s) (502) may include a central processing unit (CPU), a graphics processing unit (GPU), a tensor processing unit (TPU), combinations thereof, etc.

The input device(s) (510) may include a touchscreen, keyboard, mouse, microphone, touchpad, electronic pen, or any other type of input device. The input device(s) (510) may receive inputs from a user that are responsive to data and messages presented by the output device(s) (512). The inputs may include text input, audio input, video input, etc., which may be processed and transmitted by the computing system (500) in accordance with one or more embodiments. The communication interface (508) may include an integrated circuit for connecting the computing system (500) to a network (not shown) (e.g., a local area network (LAN), a wide area network (WAN) such as the Internet, mobile network, or any other type of network) or to another device, such as another computing device, and combinations thereof.

Further, the output device(s) (512) may include a display device, a printer, external storage, or any other output device. One or more of the output device(s) (512) may be the same or different from the input device(s) (510). The input device(s) (510) and output device(s) (512) may be locally or remotely connected to the computer processor(s) (502). Many different types of computing systems exist, and the aforementioned input device(s) (510) and output device(s) (512) may take other forms. The output device(s) (512) may display data and messages that are transmitted and received by the computing system (500). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (502), is configured to perform one or more embodiments, which may include transmitting, receiving, presenting, and displaying data and messages described in the other figures of the disclosure.

Figure 5B:
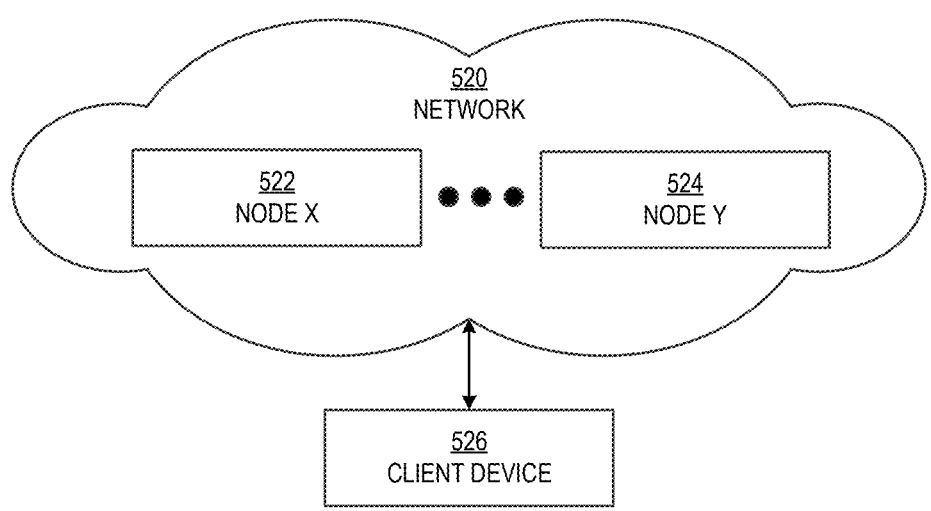

The computing system (500) in FIG. 5A may be connected to, or be a part of, a network. For example, as shown in FIG. 5B, the network (520) may include multiple nodes (e.g., node X (522) and node Y (524), as well as extant intervening nodes between node X (522) and node Y (524)). Each node may correspond to a computing system, such as the computing system shown in FIG. 5A, or a group of nodes combined may correspond to the computing system shown in FIG. 5A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (500) may be located at a remote location and connected to the other elements over a network.

The nodes (e.g., node X (522) and node Y (524)) in the network (520) may be configured to provide services for a client device (526). The services may include receiving requests and transmitting responses to the client device (526). For example, the nodes may be part of a cloud computing system. The client device (526) may be a computing system, such as the computing system shown in FIG. 5A. Further, the client device (526) may include or perform all or a portion of one or more embodiments.

The computing system of FIG. 5A may include functionality to present data (including raw data, processed data, and combinations thereof) such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown, as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include, or be included within, the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before," "after," "single," and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
performing a plurality of operations comprising:
constructing a schema segment from a schema segment definition, wherein the schema segment comprises a plurality of schema elements,
generating, by an embedding model, a plurality of embeddings corresponding to the plurality of schema elements,
grouping the plurality of schema elements and the plurality of embeddings into a plurality of categories,
detecting a semantic collision between a first embedding of a first schema element and a second embedding of a second schema element of a category of the plurality of categories, to obtain a set of semantic collisions,
resolving, by a large language model (LLM), the set of semantic collisions to obtain a corresponding plurality of updated schema elements, and
updating the schema segment with the corresponding plurality of updated schema elements.

2. The method of claim 1, further comprising:
detecting, after updating, at least one additional semantic collision added to the set of semantic collisions responsive to updating the schema segment,
wherein the plurality of operations is iteratively performed until the set of semantic collisions is resolved.

3. The method of claim 1, wherein constructing the schema segment further comprises:
parsing the schema segment definition, wherein the schema segment definition comprises a plurality of string representations, to obtain the plurality of schema elements, wherein each schema element comprises a name, a description, and a schema element kind.

4. The method of claim 1, wherein generating the plurality of embeddings corresponding to the plurality of schema elements further comprises:
responsive to a schema element of the plurality of schema elements being an atomic element,
generating, for the schema element, an embedding encoding at least a name of the schema element, a description of the schema element, and a schema element kind of the schema element by the embedding model.

5. The method of claim 1, wherein generating the plurality of embeddings corresponding to the plurality of schema elements further comprises:
responsive to a schema element of the plurality of schema elements being a composite element, comprising a set of schema elements,
generating, for the schema element, an embedding encoding at least a name of the schema element, a description of the schema element, a schema element kind of the schema element, and respective embeddings of the set of schema elements.

6. The method of claim 1, wherein grouping the schema elements further comprises:
selecting a sub-plurality of schema elements from the plurality of schema elements, based on schema element kinds of the sub-plurality of schema elements; and
adding the sub-plurality of schema elements and corresponding schema element embeddings to a category, to obtain the plurality of categories.

7. The method of claim 1, further comprising:
for a category of the plurality of categories,
constructing a cosine distance matrix, comprising cosine distance values of embeddings of schema element pairs, wherein the schema element pairs have matching schema element kinds, and wherein the cosine distance values are obtained by applying a cosine distance function to the embeddings of the schema element pairs; and
determining a collision threshold corresponding to the category, based on a statistical property of the cosine distance matrix.

8. The method of claim 1, further comprising:
identifying the semantic collision between the first embedding of the first schema element and the second embedding of the second schema element responsive to a cosine distance value of the first embedding and the second embedding falling below a collision threshold, wherein the cosine distance value is obtained by applying a cosine distance function to the first embedding and the second embedding.

9. The method of claim 1, further comprising:
generating, by the LLM, a first description corresponding to the first schema element and a second description corresponding to the second schema element, wherein the first description is dissimilar to the second description; and
updating the schema segment with the first schema element and the second schema element.

10. The method of claim 1, further comprising:
responsive to the second schema element being a near-duplicate of the first schema element,
defining, by the LLM, a canonical schema element comprising common data types and descriptions of the first schema element and the second schema element,
replacing the first schema element and the second schema element with the canonical schema element in the schema segment, and
updating references to the first schema element and the second schema element in the schema segment with a reference to the canonical schema element.

11. A system comprising:
a computer processor;
an embedding model, executing on the computer processor;
a large language model (LLM), executing on the computer processor;
a developer application, executing on the computer processor; and
a schema improvement engine, executing on the computer processor and configured for performing a plurality of operations, comprising:
constructing a schema segment from a schema segment definition, wherein the schema segment comprises a plurality of schema elements,
causing the embedding model to generate a plurality of embeddings corresponding to the plurality of schema elements, grouping the plurality of schema elements and the corresponding plurality of embeddings into a plurality of categories, detecting a semantic collision between a first embedding of a first schema element and a second embedding of a second schema element of a category of the plurality of categories, to obtain a set of semantic collisions, causing the LLM to resolve the set of semantic collisions, to obtain a corresponding plurality of updated schema elements, and updating the schema segment with the corresponding plurality of updated schema elements.

12. The system of claim 11, further configured for:

detecting, by the schema improvement engine, after updating, at least one additional semantic collision added to the set of semantic collisions responsive to updating the schema segment, wherein the plurality of operations is iteratively performed until the set of semantic collisions is resolved.

13. The system of claim 11, wherein constructing the schema segment further comprises:

parsing, by the schema improvement engine, the schema segment definition, wherein the schema segment definition comprises a plurality of string representations, to obtain the plurality of schema elements, wherein each schema element comprises a name, a description, and a schema element kind.

14. The system of claim 11, wherein generating the plurality of embeddings corresponding to the plurality of schema elements further comprises:

responsive to a schema element of the plurality of schema elements being an atomic element, generating, by the embedding model, for the schema element, an embedding encoding at least a name of the schema element, a description of the schema element, and a schema element kind of the schema element.

15. The system of claim 11, wherein generating the plurality of embeddings corresponding to the plurality of schema elements further comprises:

responsive to a schema element of the plurality of schema elements being a composite element, comprising a set of schema elements, generating, by the embedding model, for the schema element, an embedding encoding at least a name of the schema element, a description of the schema element, a schema element kind of the schema element, and respective embeddings of the set of schema elements.

16. The system of claim 11, wherein grouping the schema elements further comprises:

selecting a sub-plurality of schema elements from the plurality of schema elements, based on schema element kinds of the sub-plurality of schema elements; and adding the sub-plurality of schema elements and corresponding schema element embeddings to a category, to obtain the plurality of categories.

17. The system of claim 11, further configured for:

for a category of the plurality of categories, constructing, by the schema improvement engine, a cosine distance matrix, comprising cosine distance values of embeddings of schema element pairs, wherein the schema element pairs have matching schema element kinds, and wherein the cosine distance values are obtained by applying a cosine distance function to the embeddings of the schema element pairs; and determining a collision threshold corresponding to the category, based on a statistical property of the cosine distance matrix.

18. The system of claim 11, further comprising:

identifying the semantic collision between the first embedding of the first schema element and the second embedding of the second schema element responsive to a cosine distance value of the first embedding and the second embedding falling below a collision threshold, wherein the cosine distance value is obtained by applying a cosine distance function to the first embedding and the second embedding.

19. The system of claim 11, further comprising:

generating, by the LLM, a first description corresponding to the first schema element and a second description corresponding to the second schema element, wherein the first description is dissimilar to the second description;

updating the schema segment with the first schema element and the second schema element; and responsive to the second schema element being a near-duplicate of the first schema element, defining, by the LLM, a canonical schema element comprising common data types and descriptions of the first schema element and the second schema element, replacing the first schema element and the second schema element with the canonical schema element in the schema segment, and updating references to the first schema element and the second schema element in the schema segment with a reference to the canonical schema element.

20. A method comprising:

obtaining a plurality of semantic collisions corresponding to a plurality of schema element pairs of a category, wherein the category comprises a plurality of schema elements of a schema segment; and performing, by an LLM, operations comprising:

obtaining a schema element pair corresponding to a semantic collision, responsive to at least one schema element of the schema element pair having a missing description, generating a description of the at least one schema element, and updating the at least one schema element, responsive to a first schema element and a second schema element of the schema element pair having near-duplicate descriptions, generating a first description for the first schema element and a second description for the second schema element, wherein the first description is dissimilar to the second description, and updating the first schema element and the second schema element, and responsive to the first schema element and the second schema element of the schema element pair being near-duplicates, defining a canonical schema element, comprising common data types and descriptions of the first schema element and the second schema element, replacing the first schema element and the second schema element with the canonical schema element in the schema segment, and updating references to the first schema element and the second schema element in the schema segment with a reference to the canonical schema element.

\* \* \* \* \*